(No Model.)

T. FLESHER.
BALL AND SOCKET JOINT FOR PIPES.

No. 438,148. Patented Oct. 14, 1890.

Witnesses.
W. R. Edelen.
Will B. Sage.

Inventor
Thomas Flesher.
By Leggett & Leggett
Attys

UNITED STATES PATENT OFFICE.

THOMAS FLESHER, OF DUNKIRK, NEW YORK.

BALL-AND-SOCKET JOINT FOR PIPES.

SPECIFICATION forming part of Letters Patent No. 438,148, dated October 14, 1890.

Application filed January 13, 1890. Serial No. 336,748. (No model.)

*To all whom it may concern:*

Be it known that I, THOMAS FLESHER, of Dunkirk, in the State of New York, have invented certain new and useful Improvements in Ball-and-Socket Joints for Pipes; and I do hereby declare the following to be a full, clear, and exact description of the invention, such as will enable others skilled in the art to which it appertains to make and use the same.

My invention relates to improvements in ball-and-socket joints for pipes; and it consists in certain features of construction and in the combination of parts hereinafter described, and pointed out in the claims.

Figure 1:
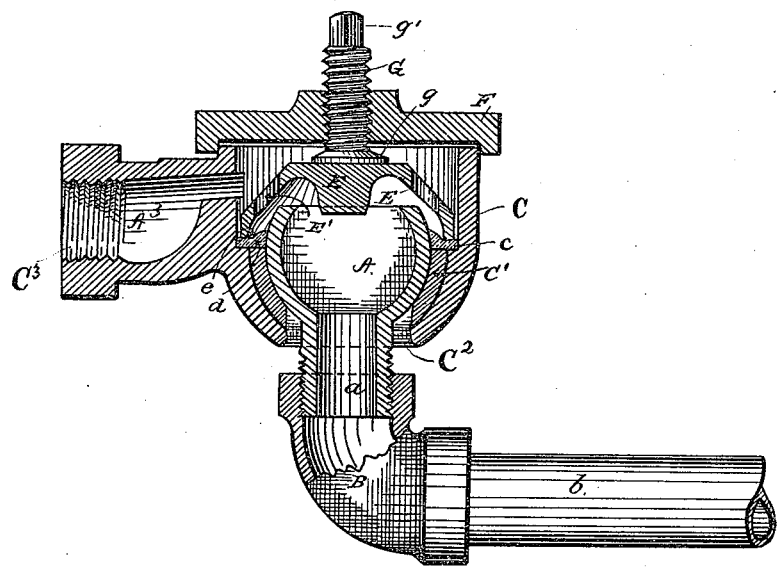
Figure 2:
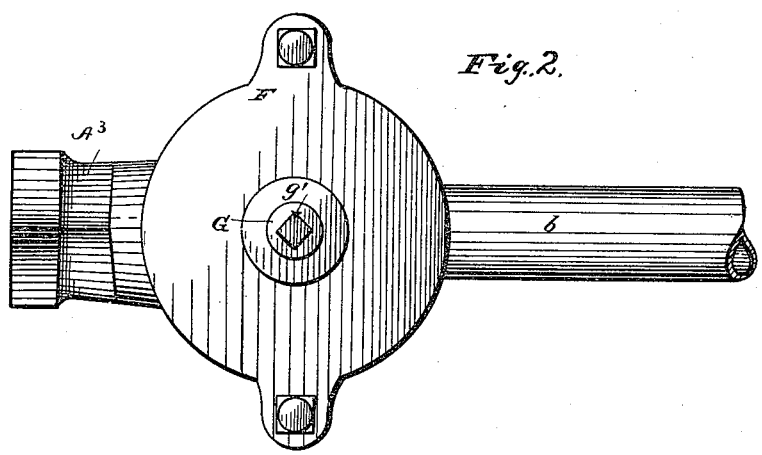
Figure 3:
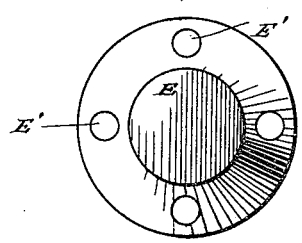

In the accompanying drawings, Figure 1 is a side elevation in section through the center of the device. Fig. 2 is a plan, and Fig. 3 is a detached view, of the gland E.

A represents a hollow section of a ball, something more than a hemisphere, and having a nozzle $a$ centrally located and projecting radially from the ball, this nozzle being screw-threaded for engaging, for instance, elbow B or other fitting for attaching a pipe, for instance, pipe $b$.

C is a casing, having preferably a Babbitt-metal seat C' for ball A. The casing has an opening $C^2$, through which opening nozzle $a$ extends, the relative sizes of opening and nozzle being such that the nozzle may vibrate the required distance in the opening as the ball rocks on its seat. The casing has also a screw-threaded nozzle $C^3$ for attaching a pipe. The casing has an annular ledge opposite the inner end of the Babbitt-metal seat, this ledge and the end wall of the Babbitt metal constituting a square shoulder $c$. Next above shoulder $c$ and resting thereon is a gasket $d$ for packing purposes, the gasket also engaging the ball. Next above the packing and resting thereon is an inverted-dish-shaped gland E, the latter being provided with a series of holes E' for the passage from one nozzle to the other of steam, air, water, &c., according to the uses to which the device may be put. The gland has also an internal beveled edge $e$ for crowding the packing against the ball. The casing is provided with a cap F, as shown, and through a centrally-located screw-threaded hole in the cap operates a set-screw G. This screw has preferably a broad head $g$ for engaging the gland, and the outer end of the screw should be squared, flattened, or otherwise shaped—for instance, as shown at $g'$—for engaging a wrench, by means of which the screw is operated.

The parts having been assembled, by turning screw G gland E is forced upon the packing, holding down the latter firmly on shoulder $c$, and at the same time crowding the packing against the ball, thus securing a tight joint around the ball and also covering the joint between the Babbitt-metal seat and the casing. It is somewhat troublesome and quite expensive to turn a seat on the casing to fit the ball, but the ball may be suspended in its place and a Babbitt-metal seat cast in with little trouble and with little expense. Shoulder $c$ should be opposite the spherical center of the ball, and hence the packing, which should be of considerable thickness, holds the ball to its seat. The ball-section extends inward so far beyond the packing that the edges of the ball are not turned past or quite to the packing in vibrating nozzle $a$ as far as the opening in the casing will admit.

The device will be found useful wherever a joint is required in a pipe, but is especially well adapted to steam, air, or water pipes leading from one car to another on steam-cars.

What I claim is—

1. In a ball-and-socket joint for pipes, in combination, a hollow section of a ball having an outwardly-projecting centrally-located nozzle, a casing having a seat for the ball and having a nozzle and having an opening in which the ball-nozzle may vibrate, packing inserted between the ball and casing, and a gland for compressing such packing, such gland spanning the passage between the two nozzles and having a series of openings whereby a continuous passage-way is had from one nozzle to the other, substantially as set forth.

2. In a ball-and-socket joint for pipes, in combination, a sectional hollow ball and casing, substantially as indicated, such casing having an internal ledge, a Babbitt-metal seat for the ball, such seat being flush with such internal ledge, the ledge and end wall of the seat comprising a square shoulder, packing adapted to rest on such shoulder and at the same time engage the ball, a gland for compressing such packing, and a screw for tightening such gland, said gland having a series of openings through which communication is had between the two nozzles, the parts being arranged substantially as and for the purpose set forth.

3. In a ball-and-socket joint for pipes, in combination, a ball and casing substantially as indicated, a shoulder at the inner end of the ball-seat, packing adapted to rest on such shoulder and at the same time to engage the ball, an inverted-dish shaped gland adapted to compress the packing upon the shoulder and at the same time crowd the packing against the ball, and a screw for tightening the gland, the parts being arranged substantially as and for the purpose set forth.

4. In a ball-and-socket joint for pipes, in combination, a ball and casing, substantially as indicated, a shoulder at the inner end of the ball-seat, such shoulder being opposite the spherical center of the ball, packing adapted to rest on such shoulder and engage the ball, an inverted-dish-shaped gland for compressing the packing, and a screw having a broad head for engaging the gland, the outer end of the screw being adapted to receive a wrench, substantially as set forth.

In testimony whereof I sign this specification in the presence of two witnesses.

THOMAS FLESHER.

Witnesses:
W. T. COLMAN,
W. E. CASIDEE.